O. F. SCOTT.
STALK CUTTER.
APPLICATION FILED JUNE 14, 1913.
1,083,636.
Patented Jan. 6, 1914.
2 SHEETS—SHEET 1.
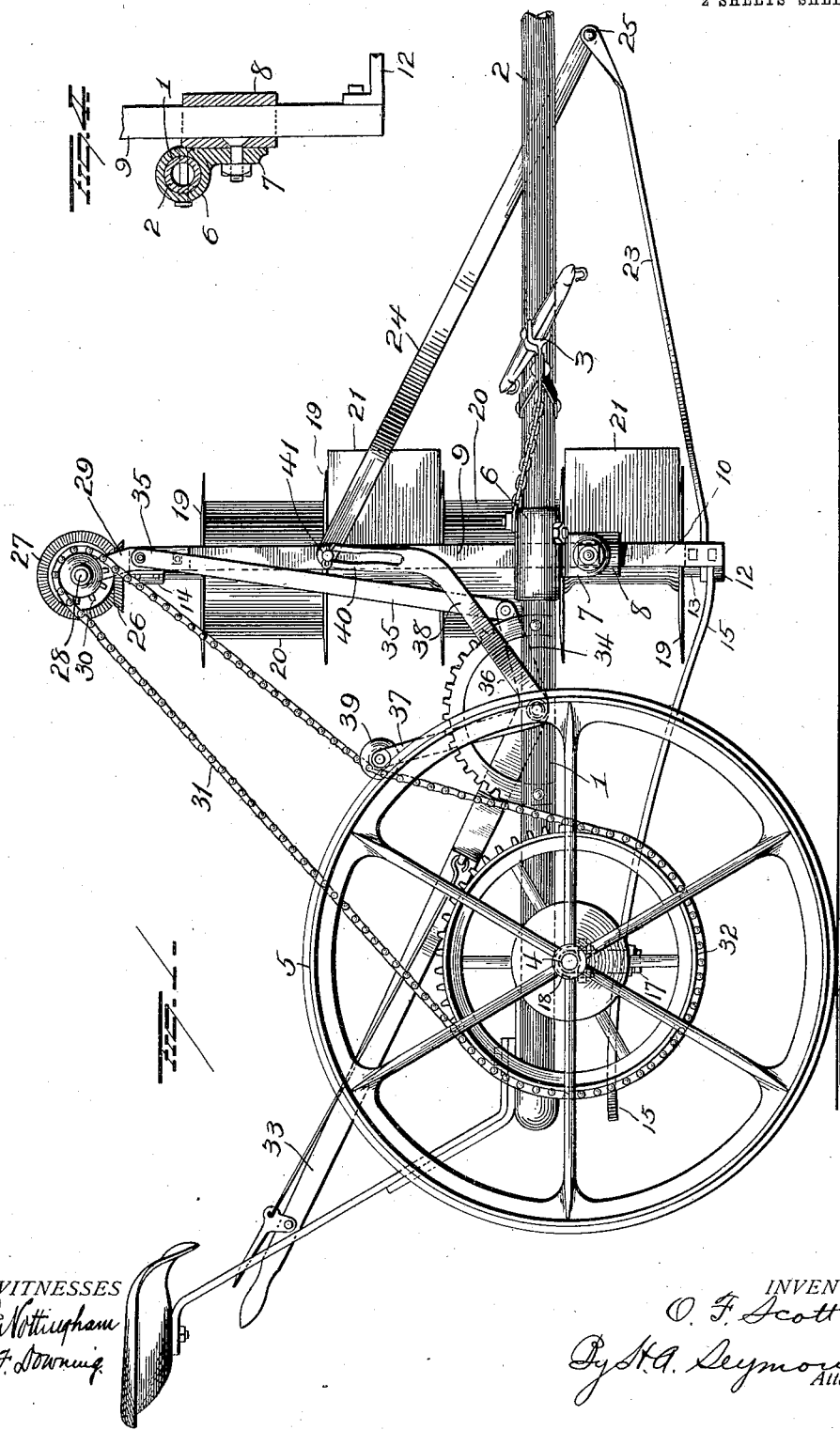
WITNESSES
INVENTOR
O. F. Scott
By H. A. Seymour
Attorney

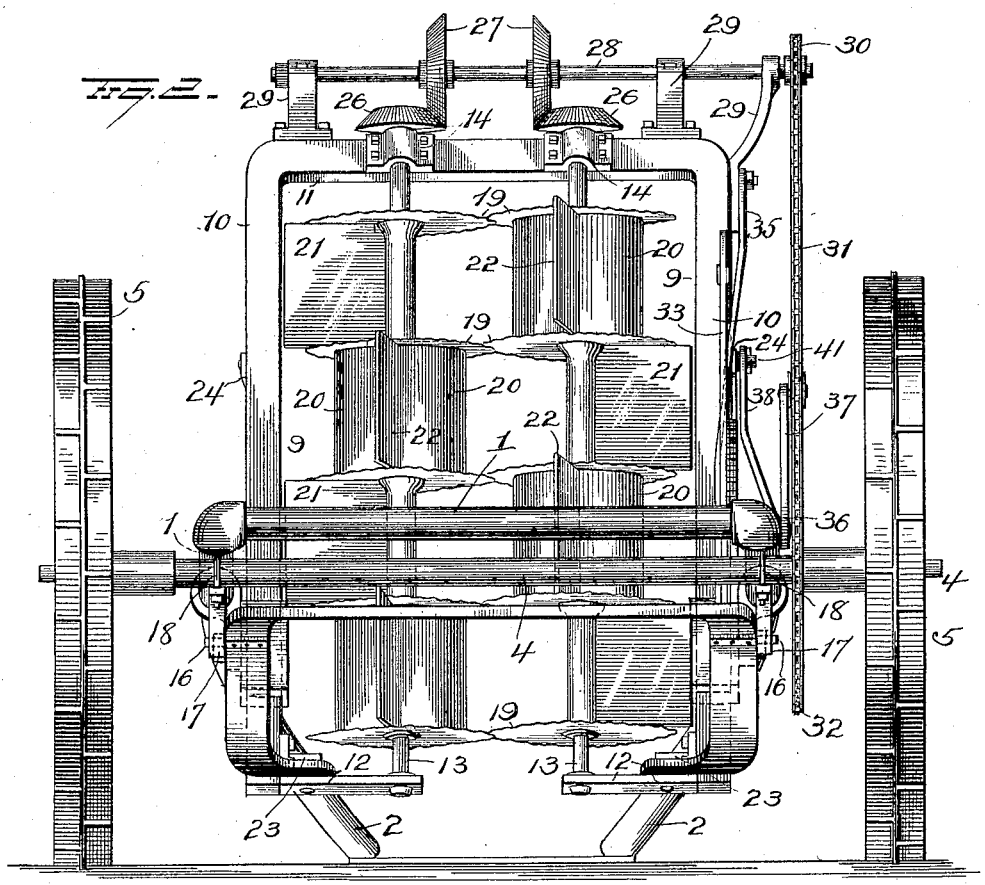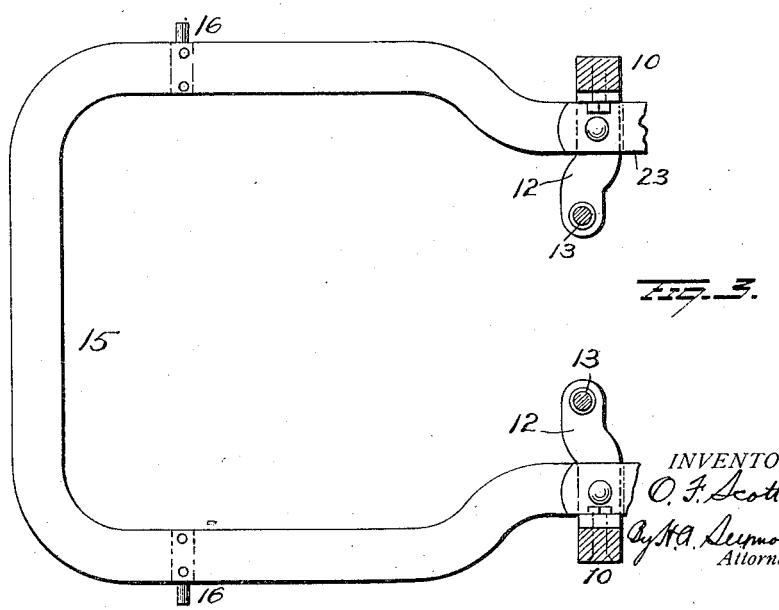

UNITED STATES PATENT OFFICE.

OSCAR F. SCOTT, OF GAINESVILLE, TEXAS.

STALK-CUTTER.

1,083,636.

Specification of Letters Patent.

Patented Jan. 6, 1914.

Application filed June 14, 1913. Serial No. 773,687.

*To all whom it may concern:*

Be it known that I, OSCAR F. SCOTT, of Gainesville, in the county of Cooke and State of Texas, have invented certain new and useful Improvements in Stalk-Cutters; and I do hereby declare the following to be a full, clear, and exact description of the invention, such as will enable others skilled in the art to which it appertains to make and use the same.

This invention relates to improvements in stalk cutters and more particularly to that type in which superimposed pairs of revoluble cutters are employed and in which the frame carrying such cutters is vertically adjustable,—one object being to improve the cutting mechanism and to so construct the same as to reduce liability to clog and so that bent or partially fallen stalks will be prevented from passing through the machine without being cut.

A further object is to provide simple, strong and efficient framework for supporting the cutting mechanism.

With these and other objects in view, the invention consists in certain novel features of construction and combinations of parts as hereinafter set forth and pointed out in the claims.

In the accompanying drawings, Figure 1 is a side elevation of a stalk chopper embodying my improvements; Fig. 2 is a rear elevation; Figs. 3 and 4 are detail views.

1 represents a base frame having a general U-shape, the side members of said frame extending forwardly to form shafts 2 and with the latter, suitable draft devices 3 are connected.

An axle 4 is secured to the base frame 1 and the journals at the ends of said axle are mounted in the hubs of traction wheels 5.

In advance of the axle, sleeves 6 are secured to the side members of the base frame and provided with depending lugs 7, to which latter, guides 8 are loosely connected for the accommodation of a frame 9. This frame comprises side members 10 movable through the guides 8 and a cross bar or top member 11 integral with and connecting the side members 10. To the lower ends of the side members 10 of frame 9, horizontal arms 12 are secured and project inwardly toward each other. The inner ends of the arms 12 are spaced apart, as shown in Figs. 2 and 3 and provided with suitable bearings for the lower ends of cutter shafts 13,—suitable bearing boxes 14 being secured to the cross bar 11 of frame 9 for the accommodation of the upper ends of said shafts. In order to insure proper rigidity of the frame 9 and prevent spreading of the same, a yoke 15 is provided and so disposed as not to interfere with the proper operation of the cutting mechanism, on the stalks. The yoke or brace 15 has a general U-shape and the forward ends of its side members are secured to the inwardly projecting arms 12 at the lower ends of the side members of the upright frame 9. From its connection with the arms 12, the yoke or brace 15 extends (as shown in Fig. 1) and its side members are provided with pintles 16 which have pivotal bearings in arms or blocks 17 suspended from the axle by means of clips 18. Thus it will be seen that the yoke or brace is connected at its forward end with the lower portions of the open cutter frame 1 and that it is pivotally supported between its ends under the axle, by which latter it is supported.

Each cutter shaft has secured thereto several rotary disk cutters 19 having serrated cutting edges, the disks on one shaft being arranged to slightly overlap the disks on the other shaft. The cutters on each shaft are suitably spaced apart, and in alternating spaces between the disks on each shaft, barrels 20 (preferably of wood) are located and extend from one disk to another, said barrels being somewhat less in diameter than that of the cutting disks. In the other spaces between the cutting disks on each shaft, paddles 21 having cutting edges at their free ends are located, each of said paddles extending from one cutting disk to another and projecting slightly beyond the peripheral cutting edges of adjacent disks. Each barrel 20 is also provided with a paddle 22 extending from one disk to another and of sufficient width to project somewhat beyond the peripheral edges of said disks. The barrels 20 and paddles 21 are so arranged that the barrels on one shaft will be parallel with the paddles 21 on the other shaft.

Stalks to be cut will be directed to the cutting mechanism, as the machine moves forwardly, by guide bars 23 and 24,—the guide bars 23 being secured at their rear ends to the arms 12 and brace yoke 15 and the upper guide bars 24 being attached at their rear ends to the side members of the frame 1, (intermediate the ends of said side members) while the forward ends of the guide bars 23—24 at each side of the machine, are connected together, as shown at 25 Fig. 1.

The cutting mechanism will be operated (as hereinafter explained) and during the rotation of the cutter shafts, the paddles between the cutter disks will operate to properly feed the stalks to the cutters and choking of the mechanism by the winding of stalks, grass, etc., between the cutters, will be effectually prevented.

It sometimes happens that bent or partially fallen stalks will tend to pass between the disks as heretofore arranged, and thus remain uncut. With my improved construction, this will be obviated, because the cooperation of the free edge of a paddle 21 on one shaft with the periphery of an adjacent barrel 20 on the other shaft (which the free edge of said paddle 21 closely approaches during the rotation of the parts), will operate to cut any stalk which might be projected between superimposed cutting disks.

The cutter shafts are provided at their upper ends with bevel gears 26, 26, to receive motion from bevel gears 27, 27, secured to a shaft 28 mounted in bearings 29 on the cutter frame 9. The shaft 28 is provided at one end with a sprocket wheel 30 to which motion is imparted by a sprocket chain 31, from a larger sprocket wheel 32 secured to the hub of one of the traction wheels.

The cutter frame is vertically adjustable to raise or lower the cutting mechanism, and in order to accomplish such adjustment of the cutter frame, a hand lever 33 is pivotally mounted on the base frame 1, and the short arm 34 of this lever is connected with the upper portion of the cutter frame 9, by means of a rod 35.

In order to compensate for the raising and lowering of the cutter frame and to maintain the tension of the drive chain 31 uniform, the devices now to be described are employed.

A lever 36 is pivotally mounted at the apex of its two arms 37 and 38, upon the base frame 1, the arm 36 being provided with a roller 39 to bear against the drive chain. The arm 38 of lever 36 is so bent as to form portions at an obtuse angle to each other and is provided in its upper portion (which lies in proximity to one side member 10 of cutter frame 9) with an elongated slot 40 into which a pin 41 on the adjacent cutter frame member 10 enters. With such construction, when the cutter frame is lowered from the position shown in Fig. 1, downward movement of the pin 41 through the slot 40 in the lever arm 38, will cause the lever 34 to turn on its pivotal mounting and the lever arm 37 to move in a direction toward the drive chain, thus causing the chain to be tightened an amount commensurate with the extent of downward movement of the cutter frame. It is evident that when the cutter frame is raised, upward movement of the pin 41 in the slot 40, will cause a shifting of the lever 34 which will tend to effect a loosening of the drive chain to compensate for the distance which the cutter frame may be raised.

Various slight changes might be made in the details of construction of my invention without departing from the spirit thereof or limiting its scope and hence I do not wish to restrict myself to the precise details herein set forth.

Having fully described my invention what I claim as new and desire to secure by Letters Patent, is:—

1. In a stalk chopper, the combination with a wheeled base frame, of an upright cutter frame mounted on said base frame and comprising integral top and side members, the side members being separated from each other at their lower ends, arms projecting inwardly from the lower ends of the side members of the cutter frame, cutting mechanism having shafts mounted on said arms and the cross bar of the cutter frame, and means for driving said cutting mechanism.

2. In a stalk cutter, the combination with a wheeled base frame, of an upright cutter frame mounted on said base frame, the side members of said cutter frame being separated from each other below their upper ends and provided at their lower ends with inwardly projecting arms, cutting mechanism having bearings on said arms and the upper part of the cutter frame, and a brace yoke connected at its ends with the lower ends of the side members of the cutter frame, and means connecting said brace yoke with the base frame.

3. In a stalk chopper, the combination with a base frame, an axle secured thereto and wheels in which said axle is mounted, of an upright cutter frame open at its lower end, a brace yoke having its forward members connected with the open lower end of the cutter frame, said yoke extending rearwardly from the cutter frame under and past the axle, and means supported under the axle and affording supports for said brace yoke.

4. In a stalk cutter, the combination with a base frame, an axle secured thereto and wheels in which said axle is mounted, of a vertically adjustable cutter frame, mounted on the base frame, said cutter frame having side members separated at their lower ends, a brace yoke having its side members connected with the separated lower ends of the side members of the cutter frame, said brace yoke extending rearwardly from the lower end of the cutter frame under and beyond the axle, arms depending from the axle, and pintles projecting from the side members of the brace yoke and pivotally mounted in said depending arms.

5. In a stalk cutter, the combination with a base frame, wheels on which said base frame is mounted, an upright cutter frame mounted on the base frame, cutting mechanism supported in said cutter frame, and means for adjusting the cutter frame vertically, of a driven shaft, gearing connecting said shaft with the cutting mechanism, a sprocket carried by said driven shaft, a sprocket secured to the hub of one of the wheels, a driven chain passing over said sprocket wheels, and means coöperating with the cutter frame and operating automatically to adjust said drive chain commensurate with the extent to which the cutter frame may be raised or lowered.

6. In a stalk cutter, the combination with a wheeled frame and a cutter frame mounted thereon, of parallel shafts mounted on the cutter frame, a plurality of superimposed cutting disks on each shaft, barrels in alternate spaces between the cutting disks on each shaft, paddles projecting from said barrels, paddles in the other spaces between disks on each shaft, the barrels and paddles being so disposed on the respective shafts that a paddle on one shaft will be in position to coöperate with a barrel on the other shaft to cut a stalk which might project between the superimposed cutting disks.

In testimony whereof I have signed this specification in the presence of two subscribing witnesses.

OSCAR F. SCOTT.

Witnesses:
  E. M. THOMPSON,
  A. O. THOMPSON.

---

Copies of this patent may be obtained for five cents each, by addressing the "Commissioner of Patents, Washington, D. C."